(12) United States Patent
Burakov et al.

(10) Patent No.: US 12,437,764 B2
(45) Date of Patent: *Oct. 7, 2025

(54) INITIALIZING NON-ASSISTANT BACKGROUND ACTIONS, VIA AN AUTOMATED ASSISTANT, WHILE ACCESSING A NON-ASSISTANT APPLICATION

(71) Applicant: GOOGLE LLC, Mountain View, CA (US)

(72) Inventors: Denis Burakov, Zurich (CH); Behshad Behzadi, Freienbach (CH); Mario Bertschler, Zurich (CH); Bohdan Vlasyuk, Zurich (CH); Daniel Cotting, Islisberg (CH); Michael Golikov, Merlischachen (CH); Lucas Mirelmann, Zurich (CH); Steve Cheng, Los Altos, CA (US); Sergey Nazarov, Zurich (CH); Zaheed Sabur, Baar (CH); Marcin Nowak-Przygodzki, Bäch (CH); Mugurel Ionut Andreica, Adliswil (CH); Radu Voroneanu, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/439,411

(22) Filed: Feb. 12, 2024

(65) Prior Publication Data
US 2024/0185857 A1 Jun. 6, 2024

Related U.S. Application Data

(63) Continuation of application No. 17/588,481, filed on Jan. 31, 2022, now Pat. No. 12,106,759, which is a continuation of application No. 16/614,224, filed as application No. PCT/US2019/036932 on Jun. 13, 2019, now Pat. No. 11,238,868.

(60) Provisional application No. 62/843,987, filed on May 6, 2019.

(51) Int. Cl.
*G10L 15/26* (2006.01)
*G06F 3/16* (2006.01)
*G10L 15/22* (2006.01)

(52) U.S. Cl.
CPC .............. *G10L 15/26* (2013.01); *G06F 3/167* (2013.01); *G10L 15/22* (2013.01); *G10L 2015/223* (2013.01)

(58) Field of Classification Search
CPC .............. G10L 15/22; G10L 2015/223; G10L 2015/228; G10L 15/26; G10L 15/1815;
(Continued)

(56) References Cited

U.S. PATENT DOCUMENTS

| | | | |
|---|---|---|---|
| 6,424,357 B1 * | 7/2002 | Frulla | G06F 3/038 715/728 |
| 9,922,648 B2 * | 3/2018 | Wang | G10L 15/26 |

(Continued)

FOREIGN PATENT DOCUMENTS

| | | |
|---|---|---|
| CN | 107391523 | 11/2017 |
| CN | 108090109 | 5/2018 |
| WO | 2020226670 | 11/2020 |

OTHER PUBLICATIONS

China National Intellectual Property Administration; Notice of Grant issued in Application No. 201980093732.0; 6 pages; dated Nov. 9, 2024.

(Continued)

*Primary Examiner* — Vijay B Chawan
(74) *Attorney, Agent, or Firm* — Gray Ice Higdon

(57) ABSTRACT

Implementations set forth herein relate to a system that employs an automated assistant to further interactions between a user and another application, which can provide the automated assistant with permission to initialize relevant application actions simultaneous to the user interacting with (Continued)

the other application. Furthermore, the system can allow the automated assistant to initialize actions of different applications, despite being actively operating a particular application. Available actions can be gleaned by the automated assistant using various application-specific schemas, which can be compared with incoming requests from a user to the automated assistant. Additional data, such as context and historical interactions, can also be used to rank and identify a suitable application action to be initialized via the automated assistant.

18 Claims, 8 Drawing Sheets

(58) Field of Classification Search
CPC ... G10L 2015/225; G10L 15/30; G10L 15/02; G10L 15/1822; G10L 15/34; G10L 2015/088; G10L 2015/227
USPC .......................................................... 704/275
See application file for complete search history.

(56) References Cited

U.S. PATENT DOCUMENTS

| | | | |
|---|---|---|---|
| 9,922,848 B2 | | 3/2018 | Wang et al. |
| 10,229,680 B1 * | | 3/2019 | Gillespie ............... G06F 40/295 |
| 11,010,550 B2 * | | 5/2021 | Bellegarda ............. G06N 3/045 |
| 11,017,766 B2 * | | 5/2021 | Chao ........................ G10L 13/00 |
| 11,031,007 B2 * | | 6/2021 | Andreica ................. G06N 3/08 |
| 11,238,857 B2 * | | 2/2022 | Skobeltsyn ............. G10L 15/22 |
| 11,238,868 B2 * | | 2/2022 | Burakov ................. G10L 15/22 |
| 11,449,308 B2 * | | 9/2022 | Szmigiel ................. G06F 3/167 |
| 11,545,151 B2 * | | 1/2023 | Burakov ................. G06F 3/167 |
| 2018/0211663 A1 * | | 7/2018 | Shin ..................... G10L 15/1815 |
| 2018/0324115 A1 | | 11/2018 | Aggarwal et al. |
| 2019/0206405 A1 * | | 7/2019 | Gillespie ............ G06Q 30/0201 |
| 2020/0302924 A1 * | | 9/2020 | Andreica ............... G06Q 50/10 |
| 2020/0357395 A1 * | | 11/2020 | Mirelmann ........... G10L 15/083 |
| 2020/0395018 A1 | | 12/2020 | Burakov et al. |
| 2022/0157317 A1 | | 5/2022 | Burakov et al. |

OTHER PUBLICATIONS

European Patent Office; Communication Pursuant to Article 94(3) EPC; 6 pages; dated Nov. 16, 2023.
China National Intellectual Property Administration; Notification of First Office Action issued in Application No. 201980093732.0; 25 pages; dated Jan. 8, 2024.
Intellectual Property India; Examination Report issued in Application No. IN202127036548; 8 pages; dated Dec. 8, 2022.
European Patent Office, International Search Report and Written Opinion of Ser. No. PCT/US2019/036932; 18 pages; dated Dec. 17, 2019.
China National Intellectual Property Administration; Notification of Second Office Action issued in Application No. 201980093732.0; 7 pages; dated Aug. 22, 2024.

* cited by examiner

INITIALIZING NON-ASSISTANT BACKGROUND ACTIONS, VIA AN AUTOMATED ASSISTANT, WHILE ACCESSING A NON-ASSISTANT APPLICATION

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., spoken utterances), which may in some cases be converted into text and then processed, and/or by providing textual (e.g., typed) natural language input. An automated assistant may respond to a request by providing responsive user interface output, which can include audible and/or visual user interface output.

Automated assistants can have limited availability when a user is operating other applications. As a result, a user may attempt to invoke an automated assistant to perform certain functions that the user associates with other applications, but ultimately terminate a dialog session with the automated assistant when the automated assistant cannot continue. For example, the limited availability or limited functionality of automated assistants may mean that users are unable to control other applications via voice commands processed by the automated assistant. This can waste computational resources, such as network and processing bandwidth, because any processing of spoken utterances during the dialog session would not have resulted in performance of any action(s). Furthermore, because of this deficiency, as a user interacts with their respective automated assistant, the user may avoid operating other applications that may otherwise provide efficiency for various tasks performed by the user. An example of such a task is the control of a separate hardware system, such as a heating system, air-conditioning system or other climate control system, via an application installed on the user's computing device. Such avoidance can lead to inefficiencies for any devices that might otherwise be assisted by such applications, such as smart thermostats and other application-controlled devices within the hardware system, as well as for any persons that might benefit from such applications or their control of associated devices.

Moreover, when a user does elect to interact with their automated assistant to perform certain tasks, the limited functionality of the automated assistant may inadvertently negate an ongoing dialog session as a result of the user opening another application. The opening of the other application can be assumed by many systems to be an indication that the user is no longer interested in furthering an ongoing dialog session, which can waste computational resources when the user is actually intending to perform an action related to the dialog session. In such instances, the dialog session may be canceled, thereby leading to the user repeating any previous spoken utterances in order to re-invoke the automated assistant, which can impede any progress of the user initializing certain application actions using such systems.

SUMMARY

Implementations set forth herein relate to one or more systems for allowing a user to invoke an automated assistant to initialize performance of one or more actions by a particular application (or a separate application), simultaneous to the user interacting with the particular application. The particular application that the user is interacting with can be associated with data that characterizes a variety of different actions capable of being performed by the particular application. Furthermore, separate applications can also be associated with the data, which can also characterize various actions capable of being performed by those separate applications. When the user is interacting with the particular application, the user can provide a spoken utterance in furtherance of completing one or more actions that the particular application, or one or more of the separate applications, can complete.

As an example, the particular application can be an alarm system application that the user is accessing via a computing device. The alarm system application may, for example, be installed on the computing device. In the discussion below, the computing device will be referred to in the context of a tablet computing device, but it will be appreciated that the computing device could alternatively be a smartphone, a smartwatch etc. The user can be using the tablet computing device to access the alarm system application in order to view video that has been captured by one or more security cameras that are in communication with the alarm system application. While viewing the videos, the user may desire to secure their alarm system. In order to do this, the user can provide a spoken utterance simultaneous to interacting with the video interface of the alarm system application, i.e., without having to close the video they are viewing or otherwise navigate to a separate interface of the alarm system application in order to secure the alarm system. For example, the user can provide a spoken utterance such as, "secure the alarm system." In some implementations, the spoken utterance can be processed at the tablet computing device and/or a remote computing device, such as a server device, in order to identify one or more actions that the user is requesting the automated assistant to initialize performance of. For instance, automatic speech recognition and/or natural language understanding of the spoken utterance can be performed on-device. Automatic speech recognition (ASR) can be performed on-device in order to detect certain terms that can correspond to particular actions capable of being performed via the device. Alternatively, or additionally, natural language understanding (NLU) can be performed on-device in order to identify certain intent(s) capable of being performed via the device.

Input data characterizing the natural language content can be used in order to determine one or more particular actions that the user is requesting to initialize via the automated assistant. For instance, the tablet computing device can access application data and/or store application data for each application that is accessible via the tablet computing device. In some implementations, the application can be accessed in response to the user invoking the automated assistant via non-voice activity (e.g., button push, physical interaction with a device, indirect input such as a gesture) and/or via voice activity (e.g., hot word, invocation phrase, detecting particular term(s) in a spoken utterance, and/or detecting that a spoken utterance corresponds to an intent(s)).

The application data may be accessed by the automated assistant in response to an invocation gesture alone, such as the voice/non-voice activity referred to above, before the remainder of a spoken user request/utterance following the invocation gesture is received and/or processed by the assistant. This may allow the assistant to obtain application data for any application which is currently running on the tablet computing device before the device has finished receiving/processing the complete request from the user, i.e., following the invocation gesture. As such, once the complete request has been received and processed, the assistant is in a position to immediately determine whether the request can be actioned by an application currently running on the device. In some cases, the application data that is obtained in this manner may be limited to application data for an application which is currently running in the foreground of a multitask operating environment on the device.

In order to access the application data, the automated assistant application can transmit a request (e.g., via an operating system) to one or more applications in response to the non-voice activity and/or the voice activity. In response, the one or more applications can provide application data characterizing contextual actions and/or global actions. The contextual actions can be identified and/or executable based on a current state of a respective application (e.g., an active application that the user is accessing) that performs the contextual actions, and the global actions can be identified and/or executable regardless of the current state of the respective application. By allowing the applications to provided application data in this way, the automated assistant can operate from accurate indexes of actions, thereby enabling the automated assistant to initialize related actions in response to a particular input. Furthermore, in some implementations, the application data can be accessed by the automated assistant without any network transmissions, as a result of ASR and/or NLU being performed on device and in combination with the action selection.

The input data can be compared to the application data for one or more different applications in order to identify one or more actions that the user is intending to initialize. In some implementations, one or more actions could be ranked and/or otherwise prioritized in order to identify a most suitable action to initialize in response to the spoken utterance. Prioritizing the one or more actions can be based on content of the spoken utterance, current, past, and/or expected usage of one or more applications, contextual data that characterizes a context in which the user provided the spoken utterance, whether the action corresponds to an active application or not, and/or any other information that can be used to prioritize one or more actions over one or more other actions. In some implementations, action(s) corresponding to the active application (i.e., an application that is executing in a foreground of a graphical user interface) can be prioritized and/or ranked higher than actions corresponding to non-active applications.

In some implementations, the application data can include structured data in the form of, for example, a schema, which can characterize a variety of different actions capable of being performed by a particular application that the application data corresponds to. For example, an alarm system application can be associated with particular application data characterizing a schema that includes a variety of different entries characterizing one or more different actions capable of being performed via the alarm system application. Furthermore, a thermostat application can be associated with other application data characterizing another schema that includes entries characterizing one or more other actions capable of being performed via the thermostat application. In some implementations, despite these two applications being different, the schema of each application can include an entry that characterizes an "on" action.

Each entry can include properties of the "on" action, a natural language description of the "on" action, a file pathway for data associated with the "on" action, and/or any other information that can be relevant to an application action. For example, an entry in the schema for the alarm system application can include a pathway for a file to execute in order to secure the alarm system. Furthermore, a separate entry in a schema for the thermostat application can include information characterizing a current status of the thermostat application and/or a thermostat that corresponds to the thermostat application. Information provided for each entry can be compared to content of a spoken utterance from the user, and/or contextual data corresponding to a context in which the spoken utterance was provided to the user. This comparison can be performed in order to rank and/or prioritize one or more actions over other actions.

For example, contextual data generated by the computing device can characterize one or more applications that are currently active at the computing device. Therefore, because the alarm system application was active at the time the user provided the spoken utterance, the "on" action characterized by the schema for the alarm system application can be prioritized over the "on" action characterized by the schema for the thermostat application. In some instances, as described in more detail below, the schema or other application data for an application which is running in the foreground of a multitasking environment may be prioritized over schemas/other application data for all other applications on the device. In this scenario, when the application which is running in the foreground changes from a first application to a second application, the application data for the second application may take priority over the application data for the first application when determining which of the applications should be used to implement the action specified in the user request.

In some implementations, application data for a particular application can characterize a variety of different actions capable of being performed by that particular application. When a spoken utterance or other input is received by an automated assistant, multiple different actions characterized by the schema can be ranked and/or prioritized. Thereafter, a highest priority action can be executed in response to the spoken utterance. As an example, the user can be operating a restaurant reservation application, which can be associated with application data characterizing a schema that identifies a variety of different actions capable of being performed by the restaurant application. While the user is interacting with the restaurant reservation application, for example when the restaurant reservation application is running in the foreground of a multitasking environment, the user can navigate to a particular interface of the application for selecting a particular restaurant at which to make reservations. While interacting with the particular interface of the application, the user can provide a spoken utterance such as, "Make the reservation for 7:30 P.M."

In response to receiving the spoken utterance, an automated assistant can cause the spoken utterance to be processed in order to identify one or more actions to initialize based on the spoken utterance. For example, content data characterizing natural language content of the received spoken utterance can be generated at a device that received the spoken utterance. The content data can be compared to application data that characterizes a variety of different actions capable of being performed via the restaurant reservation application. In some implementations, the application data can characterize one or more contextual actions capable of being performed by the application while the application is exhibiting a current status, and/or one or more global actions capable of being performed by the application regardless of the current status.

Based on the comparison, one or more actions identified in the application data can be ranked and/or prioritized in order to determine a suitable action to initialize in response to the spoken utterance. For example, the application data can characterize a "reservation time" action and a "notification time" action, each capable of being performed by the restaurant reservation application. A correspondence between content of the received spoken utterance and the actions can be determined in order to prioritize one action over the other. In some implementations, the application data can include information further characterizing each action, and this information can be compared to the content of the spoken utterance in order to determine a strength of correlation between the content of the spoken utterance and the information characterizing each action. For instance, because the content of the spoken utterance includes the term "reservation," the "reservation time" action can be prioritized over the notification time action.

In some implementations, a status of the application can be considered when selecting an action to initialize in response to a spoken utterance. For example, and in accordance with the previous example, when the user provided the spoken utterance, the restaurant reservation application may not have established a stored reservation at the time the spoken utterance was received. When the content of the spoken utterance is compared to the application data, the status of the restaurant reservation application can be accessed and also compared to the application data. The application data can characterize an application status for one or more actions capable of being performed by the reservation application. For example, the reservation time action can be correlated to a draft reservation status, whereas the notification time action can be correlated to a stored reservation status. Therefore, when there is no stored reservation, but the user is creating a draft reservation, the reservation time action can be prioritized over the notification time action, at least in response to the user providing the spoken utterance, "Make the reservation for 7:30 P.M."

In another example, the user can be operating a thermostat application, which can be associated with application data characterizing a schema that identifies a variety of different actions capable of being performed by the thermostat application. While the user is interacting with the thermostat application, for example when the thermostat application is running in the foreground of a multitasking environment, the user can navigate to a particular interface of the application for selecting a particular time at which to set an indoor temperature to a particular value. While interacting with the particular interface of the application, the user can provide a spoken utterance such as, "Set temperature to 68 degrees at 7:00 A.M."

In response to receiving the spoken utterance, an automated assistant can cause the spoken utterance to be processed in order to identify one or more actions to initialize based on the spoken utterance. For example, content data characterizing natural language content of the received spoken utterance can be generated at a device that received the spoken utterance. The content data can be compared to application data that characterizes a variety of different actions capable of being performed via the thermostat application. In some implementations, the application data can characterize one or more contextual actions capable of being performed by the application while the application is exhibiting a current status, and/or one or more global actions capable of being performed by the application regardless of the current status.

Based on the comparison, one or more actions identified in the application data can be ranked and/or prioritized in order to determine a suitable action to initialize in response to the spoken utterance. For example, the application data can characterize a "set temperature" action and a "eco mode" action, each capable of being performed by the thermostat application. A correspondence between content of the received spoken utterance and the actions can be determined in order to prioritize one action over the other. In some implementations, the application data can include information further characterizing each action, and this information can be compared to the content of the spoken utterance in order to determine a strength of correlation between the content of the spoken utterance and the information characterizing each action. For instance, because the content of the spoken utterance includes the term "set temperature," the "set temperature" action can be prioritized over the "eco mode" action.

In some implementations, a variety of different actions from different applications can be considered when responding to a spoken utterance that is provided by a user when an active application is executing at a computing device. For instance, when a user provides a spoken utterance such as, "Read my new message," while a non-messaging application (e.g., a stock application) is being rendered, the automated assistant can interpret the spoken utterance as being most correlated to an automated assistant action of reading new email messages to the user. However, when the user provides the spoken utterance when a social media application is executing in the background of the non-messaging application, the automated assistant can determine whether a status of the social media application is associated with a "new message." If the status and/or context of the background application is associated with a "new message," the automated assistant can initialize performance of a message-related action via the background application. However, if the status and/or context of the background application is not associated with a "new message," the automated assistant can perform the automated assistant action of reading any new email messages to the user, and/or if there are no new email messages, the automated assistant can provide a response such as, "There are no new messages."

By providing an automated assistant that can initialize other application actions in this way, other corresponding applications would not need to be pre-loaded with modules for voice control, but, rather, can rely on the automated assistant for ASR and/or NLU. This can conserve client-side resources that might otherwise by consumed by having multiple different applications pre-loaded with ASR and/or NLU modules, which can consume a variety of different computational resources. For instance, operating multiple different applications that each have their own respective ASR and/or NLU modules can consume processing bandwidth and/or storage resources. Therefore, utilization of the techniques discussed herein can eliminate waste of such computational resources. Furthermore, these techniques allow for a single interface (e.g., a microphone and/or other interface for interacting with an automated assistant) to control an active application, a background application, and/or an automated assistant. This can eliminate waste of computational resources that might otherwise be consumed launching separate applications and/or connecting with remote servers to process inputs.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
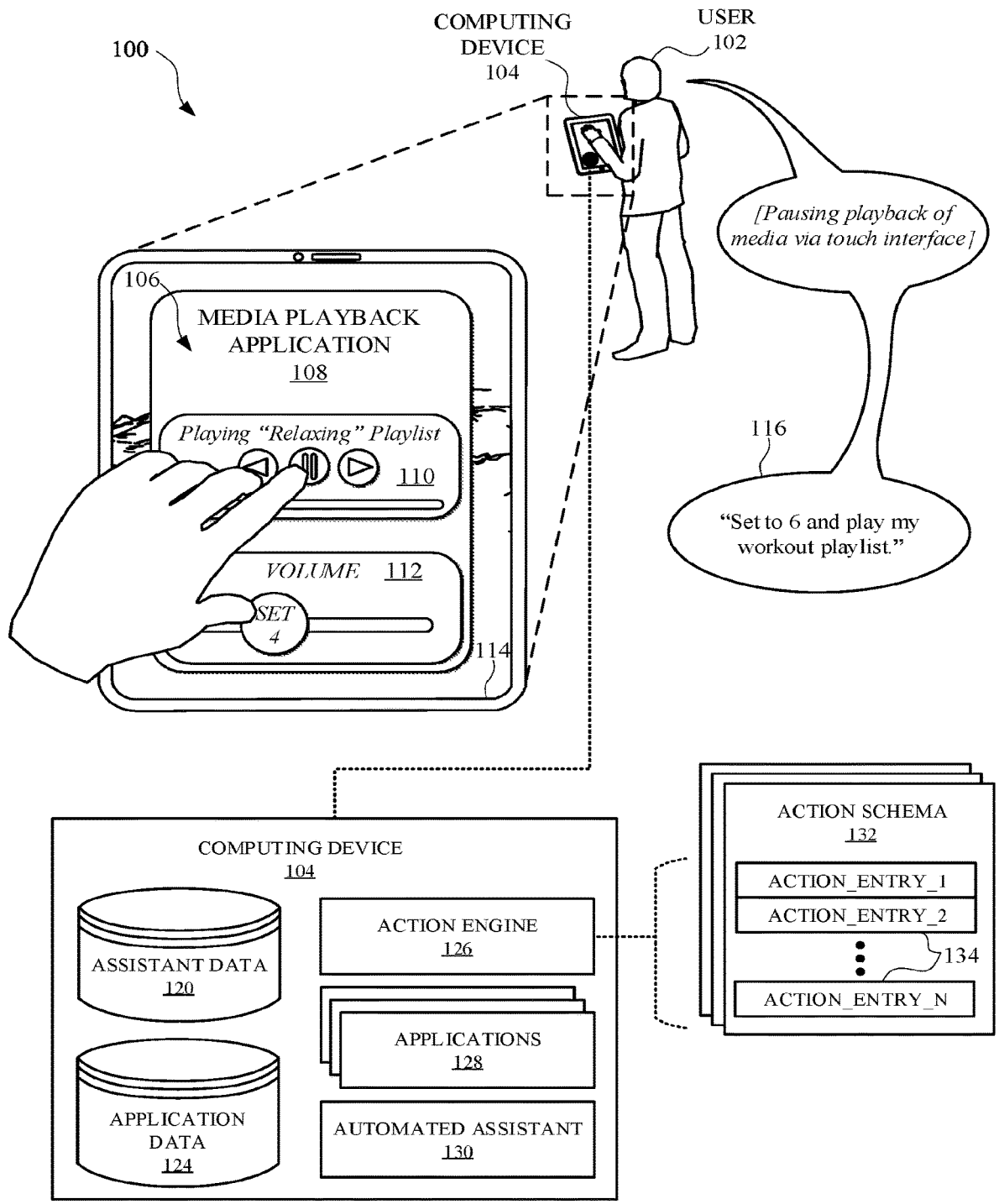
FIG. 1A and FIG. 1B illustrate a user invoking an automated assistant to control various actions of an application that includes graphical control elements for controlling other actions.
Figure 1B:
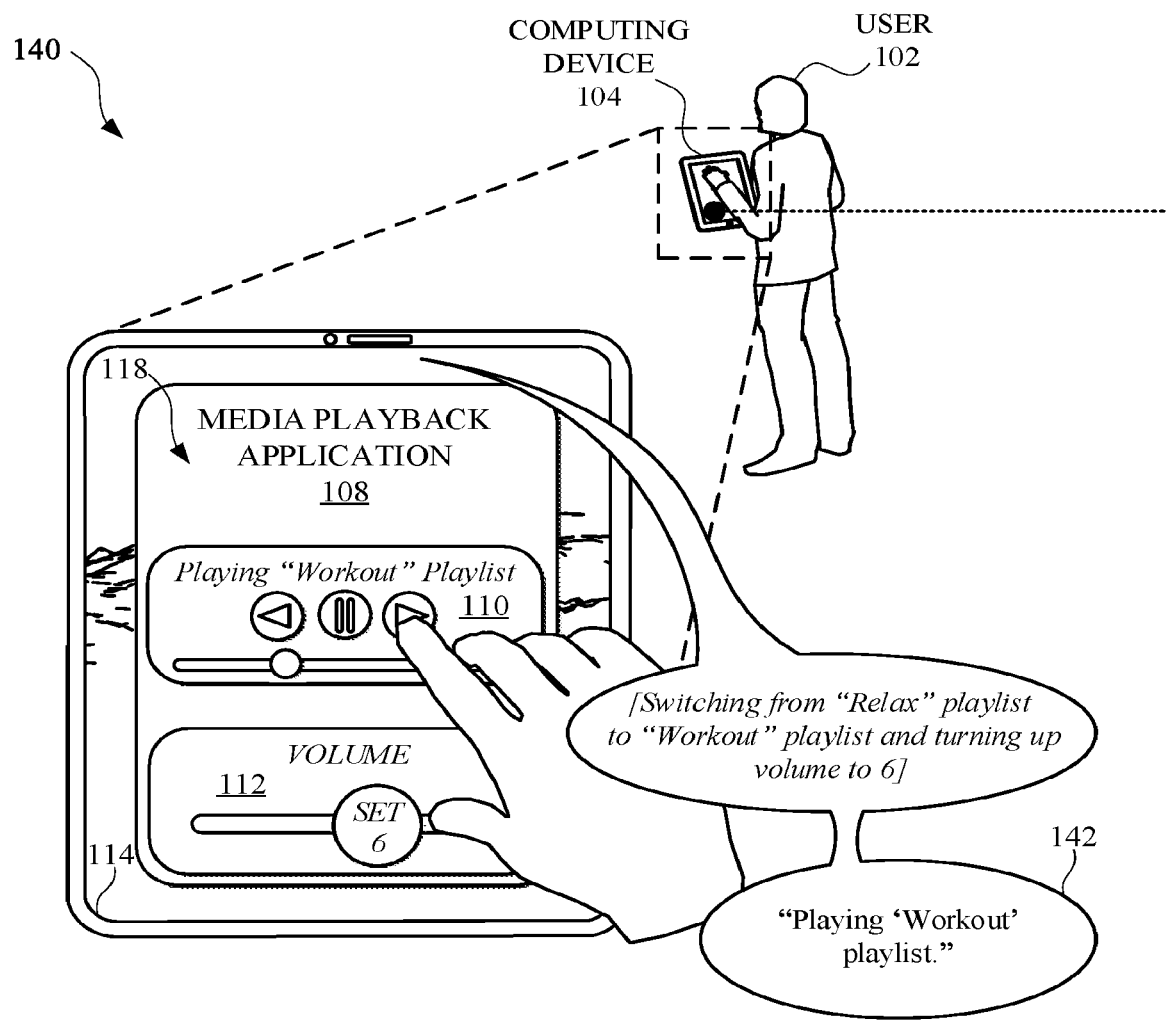

FIG. 1A and FIG. 1B illustrate view 100 and view 140 a user 102 invoking an automated assistant to control various actions of an application that includes graphical control elements for controlling certain actions, but may not present those graphical control elements at all times while executing. For example, the user 102 can be accessing a computing device 104 that includes a display panel 114 for rendering a graphical user interface 106 of an application. The application can be a media playback application 108 that includes first graphical control elements 110 and a second graphical control element 112. While the media playback application 108 is executing at the computing device 104, the user 102 can control one or more graphical elements rendered at the graphical user interface 106. Furthermore, while the user 102 is viewing the graphical user interface 106, the user 102 can provide a spoken utterance for controlling one or more actions capable of being performed via the computing device 104.

For example, the user can provide a spoken utterance 116 while they are tapping a graphical interface element, such as a pause button rendered at the graphical user interface 106 (as illustrated in FIG. 1A). The spoken utterance 116 can be, for example, "Set to 6 and play my workout playlist." In response to receiving the spoken utterance 116, one or more processors of the computing device 104 can generate audio data characterizing the spoken utterance 116, and process the audio data in furtherance of responding to the spoken utterance 116. For instance, the one or more processors can process the audio data according to a speech to text process for converting the audio data into textual data. The textual data can then be processed by the one or more processors according to a natural language understanding process. In some implementations, the speech-to-text process and/or the natural language understanding process can be performed exclusively at the computing device 104. Alternatively, or additionally, the speech-to-text process and/or the natural language understanding process can be performed at a separate server device and/or the computing device 104.

In some implementations, in response to receiving the spoken utterance 116, an automated assistant 130 of the computing device 104 can request and/or access application data 124 corresponding to one or more applications 128 that are accessible via the computing device 104. The application data 124 can characterize one or more actions capable of being performed by one or more applications 128 accessible via the computing device 104. The applications 128 can include the media playback application 108, and the media playback application 108 can provide particular application data 124 characterizing one or more actions capable of being performed by the media playback application 108. In some implementations, each application of the applications 128 can provide application data 124 that characterizes contextual actions capable of being performed by a particular application, depending on whether the particular application is operating according to a particular operating status. For example, the media playback application 108 can provide application data that characterizes one or more contextual actions capable of being performed when the first graphical control elements 110 and the second graphical control element 112 are being rendered at the graphical user interface 106. In this example, the one or more contextual actions can include a volume adjust action, a pause action, a next action and/or a previous action.

In some implementations, the application data 124 can include an action schema 132 which can be accessed by the automated assistant 130 and/or the action engine 126 for ranking and/or prioritizing actions capable of being performed by a particular application. For example, each action entry 134 identified in the action schema 132 can be provided with one or more terms or descriptors associated with a particular action. For example, a particular descriptor can characterize an interface that is affected by performance of the particular action, and/or another particular descriptor can characterize a data type that is accessed or otherwise affected by performance of the particular action. Alternatively, or additionally, an application descriptor can characterize one or more applications that can be affected by performance of the particular action, and/or another particular descriptor can characterize account permissions, account restrictions, network preferences, interface modalities, power preferences, and/or any other specification that can be associated with an application action.

Furthermore, in some implementations, each application of the applications 128 can provide application data 124 that characterizes global actions capable of being performed by a particular application regardless whether the particular application is operating according to a particular operating status (e.g., whether the application is operating in a foreground of a graphical user interface). For example, the media playback application 108 can provide application data that characterizes one or more global actions capable of being performed when the media playback application 108 is executing at the computing device 104.

In response to receiving the spoken utterance 116, the automated assistant 130 can access the application data 124 in order to determine whether the spoken utterance 116 was directed at the automated assistant 130 initializing performance of an action by an application 128. For example, the automated assistant 130 can cause an action engine 126 of the computing device 104 to process application data 124 in response to the spoken utterance 116. The action engine 126 can identify various action entries characterizing one or more actions capable of being performed via one or more applications 128 of the computing device 104. In some implementations, because the computing device 104 is rendering a graphical user interface 106 of the media playback application 108 when the user provided the spoken utterance 116, the action engine 126 can consider this context when selecting an action to initialize. For example, content of the spoken utterance 116 can be compared to application data 124 to determine whether the content correlates to one or more actions capable of being performed by the media playback application 108. Each action can be ranked and/or prioritized according to the correlation between a particular action and the content of the spoken utterance 116.

Alternatively, or additionally, each action can be ranked and/or prioritized according to a determined correlation between a particular action and the context in which the user provided the spoken utterance 116. As an example, an action identified by the application data 124 can be a volume adjust action, which can accept numerical slot values between 0 and 10 for performing the action. Therefore, because the spoken utterance includes the number "6," the content of the spoken utterance 116 therefore has a correlation to the volume adjust action. Alternatively, or additionally, because the graphical user interface 106 is currently rendering a "volume" control element (the second graphical control element 112), which also identifies a number (e.g., "set 4"), the action engine 126 can also determine that context of the spoken utterance 116 is correlated to volume adjust action.

In some implementations, based on the natural language understanding of the spoken utterance 116, the action engine 126 can identify another action corresponding to another portion of the spoken utterance 116. For instance, in order to identify a suitable action to initialize in response to the user 102 saying, "Play my workout playlist," the action engine 126 can access the application data 124 and compare the action data to this portion of the spoken utterance 116. Specifically, the action engine 126 can access the action schema 132 and prioritize one or more action entries 134 according to a strength of correlation of each entry to the latter portion of the spoken utterance 116. For example, an action entry 134 that characterizes an action as a "play playlist" action can be prioritized and/or ranked over any other action entry 134. As a result, this highest prioritized and/or highest-ranked action entry corresponding to the "play playlist" action can be selected for executing. Furthermore, the "play playlist" action can include a slot value for identifying the playlist to be played and, therefore, natural language content of the spoken utterance 116 can be used to satisfy this slot value. For instance, the automated assistant 130 can assign "workout" at the slot value for the name of the playlist to be played in furtherance of completing the "play playlist" action.

In some implementations, contextual data characterizing a context in which the user 102 provided the request to play the workout playlist can be compared to the application data 124 in order to identify an action that is correlated to the context as well as the "play my playlist" portion of the spoken utterance 116. For example, contextual data of the application data 124 can characterize the graphical user interface 106 as including the text "playing 'relaxing' playlist." The action engine 126 can compare this text to the text of the action entries in order to identify an action that is most correlated to the text of the graphical user interface 106, as well as the spoken utterance 116. For example, the action engine 126 can rank and/or prioritize a "play playlist" action over any other action based on the text of the graphical user interface 106 including the terms "play" and "playlist."

As illustrated in view 140 of FIG. 1B, the automated assistant 130 can cause performance of one or more actions without interfering with the user accessing and/or interacting with the media playback application 108. For example, in response to the user 102 providing the spoken utterance 116, the automated assistant 130 can initialize one or more actions for performance by the media playback application 108. Resulting changes to the operations of the media playback application 108 can be exhibited at an updated graphical user interface 118, which can show the "workout" playlist being played at the computing device 104, and the volume being set to "6," per the request of the user 102. The automated assistant 130 can provide an output 142 confirming the fulfillment of the requests from the user 102, and/or the updated graphical user interface 118 can be rendered to reflect the changes caused by the automated assistant 130 invoking the media playback application 108 to perform the actions.

Figure 2A:
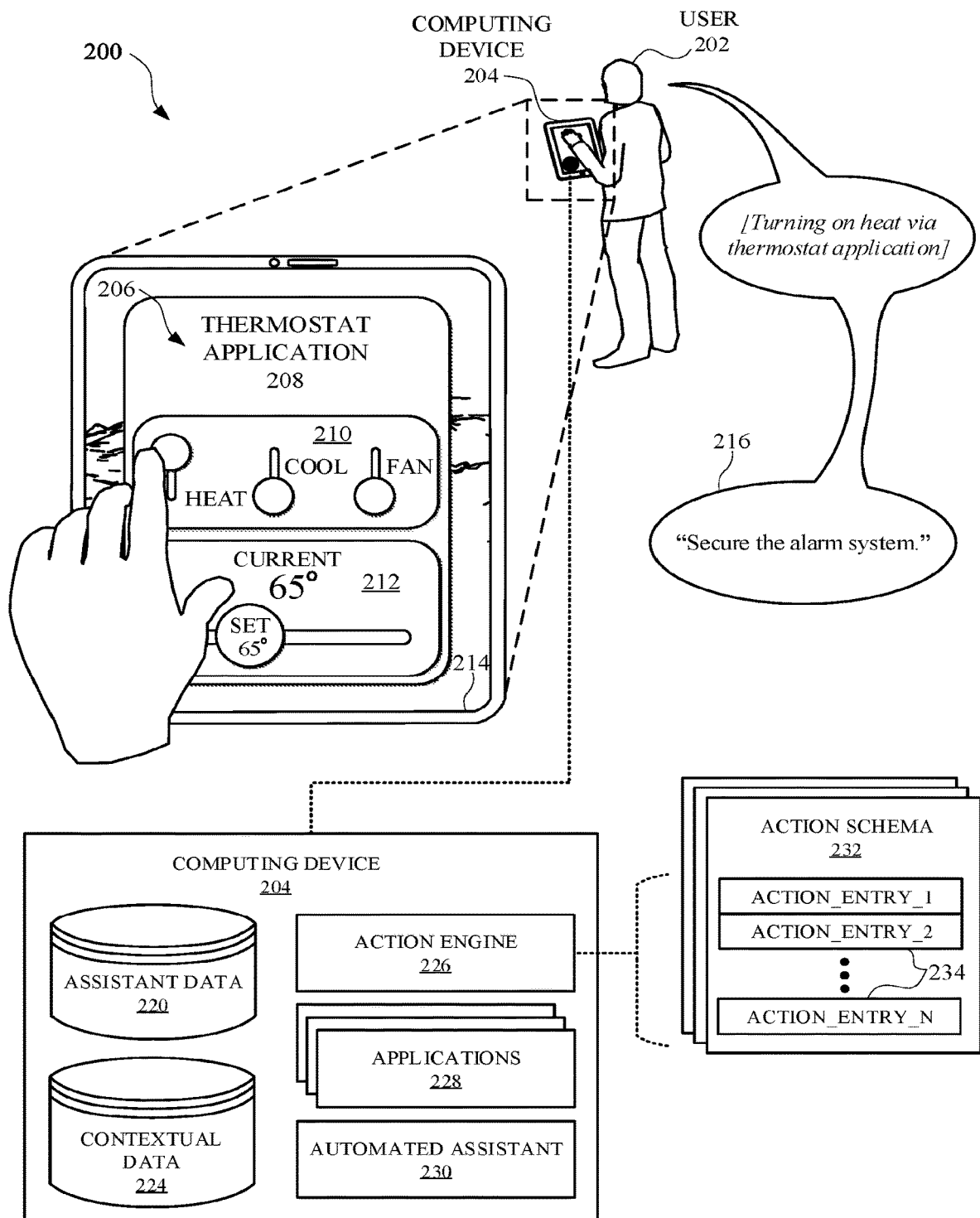
FIG. 2A and FIG. 2B illustrate a user accessing a particular application that is being rendered in a foreground of a display panel of a computing device, while the user is also controlling a separate third-party application via input to an automated assistant.
Figure 2B:
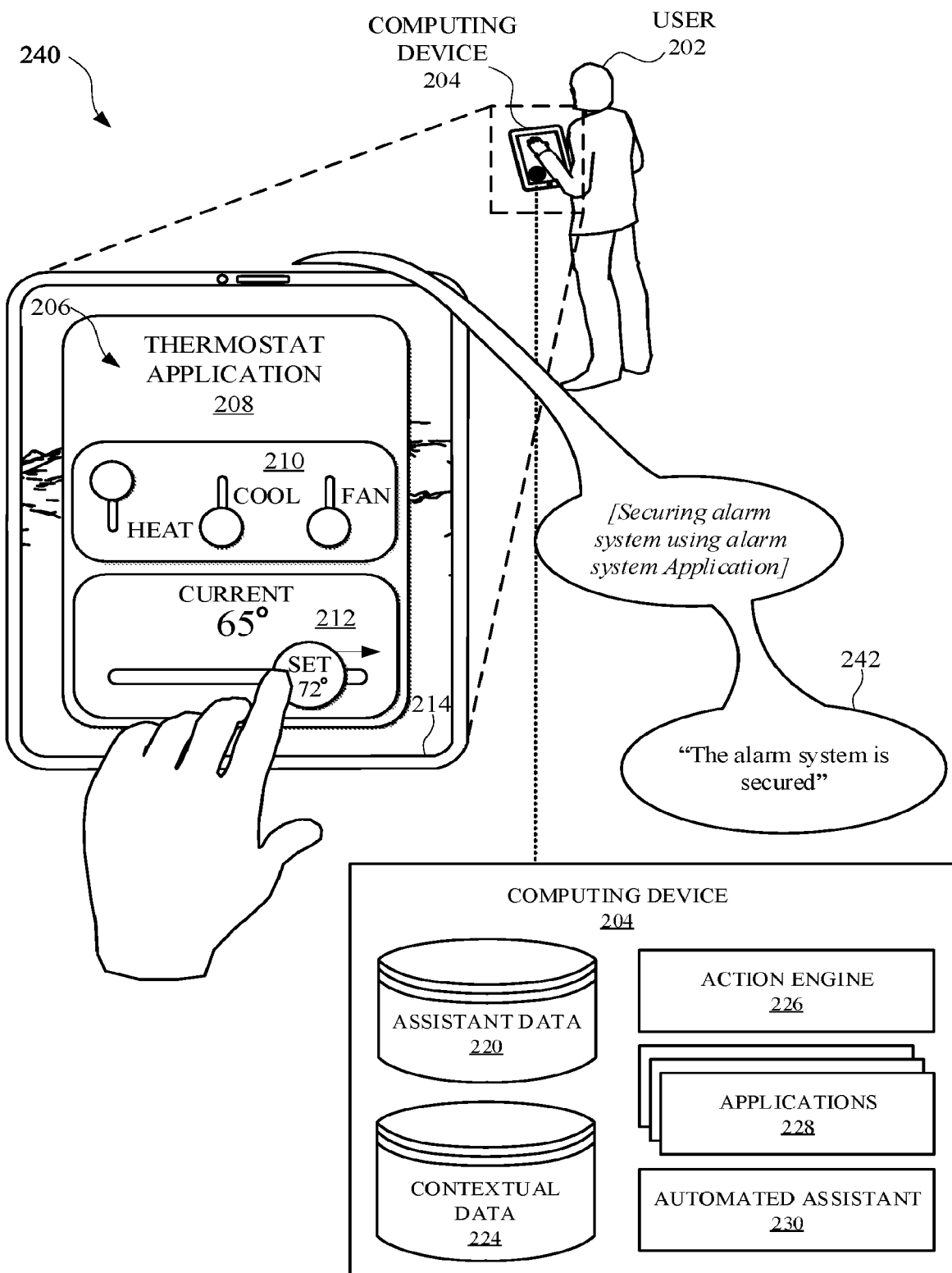

FIGS. 2A and 2B illustrate a view 200 and a view 240, respectively, of a user 202 accessing a particular application that is being rendered in a foreground of a display panel 214 of a computing device 204, while the user 202 is also controlling a separate third-party application via input to an automated assistant 230. For example, the user 202 can be accessing an application, such as a thermostat application 208, which can be rendered at a graphical user interface 206 of the display panel 214. While interacting with the thermostat application 208, such as by turning on the heat via first graphical elements 210, the user 202 can provide a spoken utterance 216 such as, "Secure the alarm system." From the perspective of the user 202, the user 202 may be intending to control a third-party application, such as an alarm system application. However, in order to effectively execute such control by the user 202, the computing device 204 can undertake a variety of operations for handling this spoken utterance 216, and/or any other inputs from the user 202.

For example, in response to receiving the spoken utterance 216 and/or any other input to the automated assistant 230, the automated assistant 230 can cause one or more applications 228 to be queried in order to identify one or more actions capable of being performed by the one or more applications 228. In some implementations, each application 228 can provide an action schema 232, which can characterize one or more actions capable of being performed by a respective application. An action schema 232 for a particular application 228 can characterize contextual actions that can be performed when the particular application 228 is executing and exhibiting a current status. Alternatively, or additionally, the action schema 232 for a particular application 228 can characterize global actions that can be performed regardless of a status of the particular application 228.

The spoken utterance 216 can be processed locally at the computing device 204, which can provide a speech to text engine and/or a natural language understanding engine. Based on the processing of the spoken utterance 216, an action engine 226 can identify one or more action entries 234 based on the content of the spoken utterance 216. In some implementations, one or more identified actions can be ranked and/or prioritized according to a variety of different data that is accessible to the automated assistant 230. For example, contextual data 224 can be used to rank one or more identified actions in order that a highest ranked action can be initialized for performance in response to the spoken utterance 216. The contextual data can characterize one or more features of one or more interactions between the user 202 and the computing device 204, such as content of the graphical user interface 206, one or more applications that are executing at the computing device 204, stored preferences of the user 202, and/or any other information that can characterize a context at the user 202. Furthermore, assistant data 220 can be used to rank and/or prioritize one or more identified actions to be performed by a particular application in response to the spoken utterance 216. The assistant data 220 can characterize details of one or more interactions between the user 202 and the automated assistant 230, a location of the user 202, preferences of the user 202 with respect to the automated assistant 230, other devices that provide access to the automated assistant 230, and/or any other information that can be associated with an automated assistant.

In response to the spoken utterance 216, and/or based on accessing one or more action schemas 232 corresponding to one or more applications 228, the action engine 226 can identify one or more action entries 234 that correlate to the spoken utterance 216. For example, content of the spoken utterance 216 can be compared to action entries corresponding to the thermostat application 208, and determine that the thermostat application 208 does not include an action that is explicitly labeled with the term "alarm." However, the action engine 226 can compare the content of the spoken utterance 216 to another action entry 234 corresponding to a separate application, such as an alarm system application. The action engine 226 can determine that the alarm system application can perform an action that is explicitly labeled "arm," and that the action entry for the "arm" action includes a description of the action as being useful for "securing" the alarm system. As a result, the action engine 226 can rank and/or prioritize the "arm" action of the alarm system application over any other action identified by the action engine 226.

As illustrated in view 240 of FIG. 2B, the automated assistant 230 can initialize performance of the "arm" action as a background process, while maintaining the thermostat application 208 in a foreground of the display panel 214. For example, as the user 202 turns on the heat and changes the temperature setting for the thermostat application 208, the user 202 can cause the alarm system to be secured, as indicated by an output 242 of the automated assistant 230. In this way, background processes can be initialized and streamlined without interfering with any foreground processes that the user is engaged with. This can eliminate waste of computational resources that might otherwise be consumed switching between applications in the foreground, and/or reinitializing actions that the user has invoked via the foreground application.

In some implementations, the assistant data 220 can characterize success metrics that are based on a number of times that a particular action and/or a particular application have been invoked by the user, but have not been successfully performed. For example, when the automated assistant 230 determines that the alarm system has been secured, a success metric corresponding to the "arm" action, and/or the alarm system application, can be modified to reflect the completion of the "arm" action. However, if the "arm" action was not successfully performed, the success metric can be modified to reflect the failure of the "arm" action to be completed. In this way, when a success metric fails to satisfy a particular success metric threshold, but the user has requested an action corresponding to the failing success metric, the automated assistant 230 can cause a notification to be provided to the user regarding how to proceed with the action. For example, the automated assistant 230 can cause the display panel 214 to render a notification such as, "Please open the [application_name] to perform that action," in response to receiving a spoken utterance that includes a request for an action that corresponds to a success metric that does not satisfy a success metric threshold.

Figure 3:
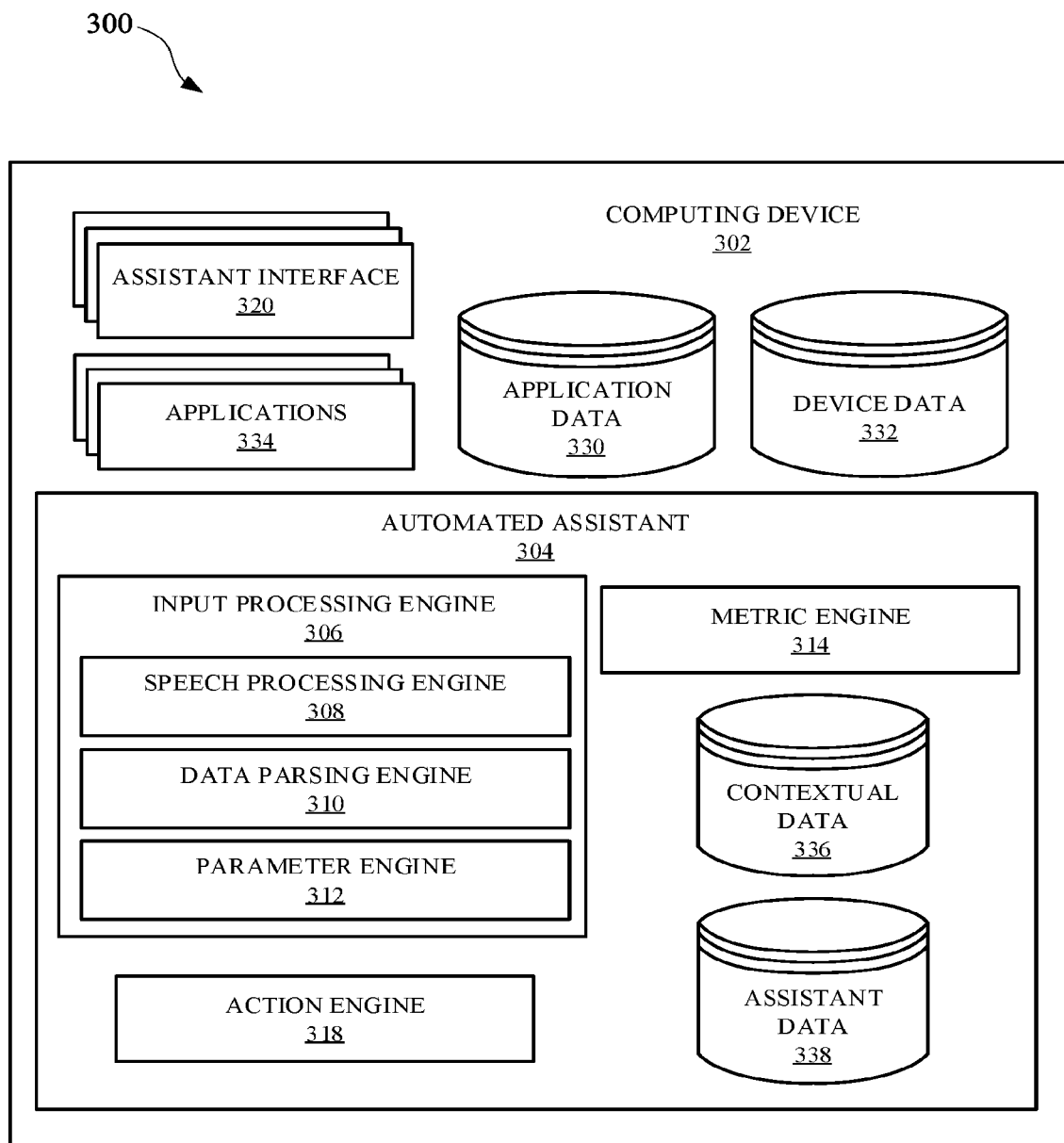
FIG. 3 illustrates a system for allowing an automated assistant to initialize actions of one or more applications regardless of whether a targeted application and/or respective graphical control element is being presented in a foreground of a graphical user interface.

FIG. 3 illustrates a system 300 for allowing an automated assistant 304 to initialize actions of one or more applications regardless of whether a targeted application and/or respective graphical control element is being presented in a foreground of a graphical user interface. The automated assistant 304 can operate as part of an assistant application that is provided at one or more computing devices, such as a computing device 302 and/or a server device. A user can interact with the automated assistant 304 via an assistant interface 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to perform a function (e.g., provide data, control a peripheral device, access an agent, generate an input and/or an output, etc.). The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions.

In some implementations, the computing device 302 can include one or more applications 334 which can be provided by a third-party entity that is different from an entity that provided the computing device 302 and/or the automated assistant 304. An action engine 318 of the automated assistant 304 and/or the computing device 302 can access application data 330 to determine one or more actions capable of being performed by one or more applications 334. Furthermore, the application data 330 and/or any other data (e.g., device data 332) can be accessed by the automated assistant 304 to generate contextual data 336, which can characterize a context in which a particular application 334 is executing at the computing device 302 and/or a particular user is accessing the computing device 302.

While one or more applications 334 are executing at the computing device 302, the device data 332 can characterize a current operating status of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the action engine 318 in order to determine a suitable action to initialize via the automated assistant 304.

In some implementations, the action engine 318 can initialize performance of one or more actions of an application 334, regardless of whether a particular graphical control for the one or more actions is being rendered had a graphical user interface of the computing device 302. The automated assistant 304 can initialize performance of such actions, and a metric engine 314 of the automated assistant 304 can determine whether performance of such actions was completed. If a particular action was determined to be not completely performed, the metric engine 314 can modify a metric corresponding to the particular action to reflect the lack of success in the action being performed. Alternatively, or additionally, if another action was determined to be performed successively, the metric engine 314 can modify a metric corresponding to the other action to reflect a success in causing the action to be performed by a prospective application.

The action engine 318 can use the metrics determined by the metric engine 314 in order to prioritize and/or rank application actions identified by one or more action schemas. The actions can be ranked and/or prioritized in order to identify a suitable action to initialize, for example, in response to a user providing a particular spoken utterance. A spoken utterance provided by a user while a first application is executing in a foreground as an interface of the computing device 302 can cause the first application to execute an action that may not otherwise be able to initialize via a user interaction with the interface. Alternatively, or additionally, a spoken utterance can be provided by the user when a second application is executing in a background and the first application is executing in the foreground. In response to receiving the spoken utterance, the automated assistant 304 can determine that the spoken utterance corresponds to a particular action capable of being performed by the second application, and caused the second application to initialize performance of the particular action without interrupting the first application in the foreground. In some implementations, the automated assistant 304 can provide an indication that the particular action was successfully performed by the second application in the background. In some implementations, despite the user interacting with the first application in the foreground, a different user can provide the spoken utterance that causes the second application to perform the particular action in the background.

Figure 4A:
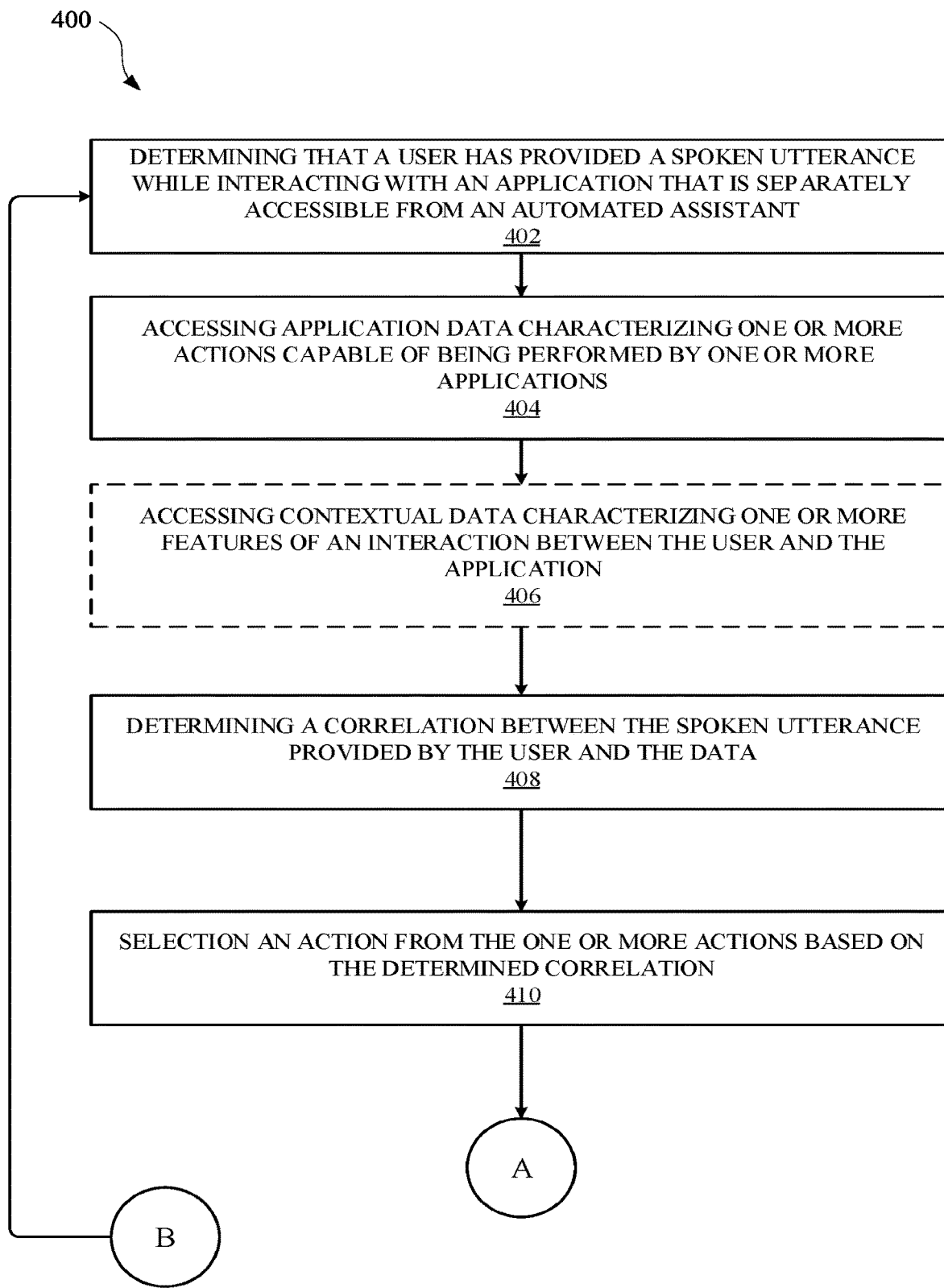
FIG. 4A and FIG. 4B illustrate a method for controlling a non-assistant application via an automated assistant while simultaneously accessing the non-assistant application, or a separate application that is different from the non-assistant application and the automated assistant.
Figure 4B:
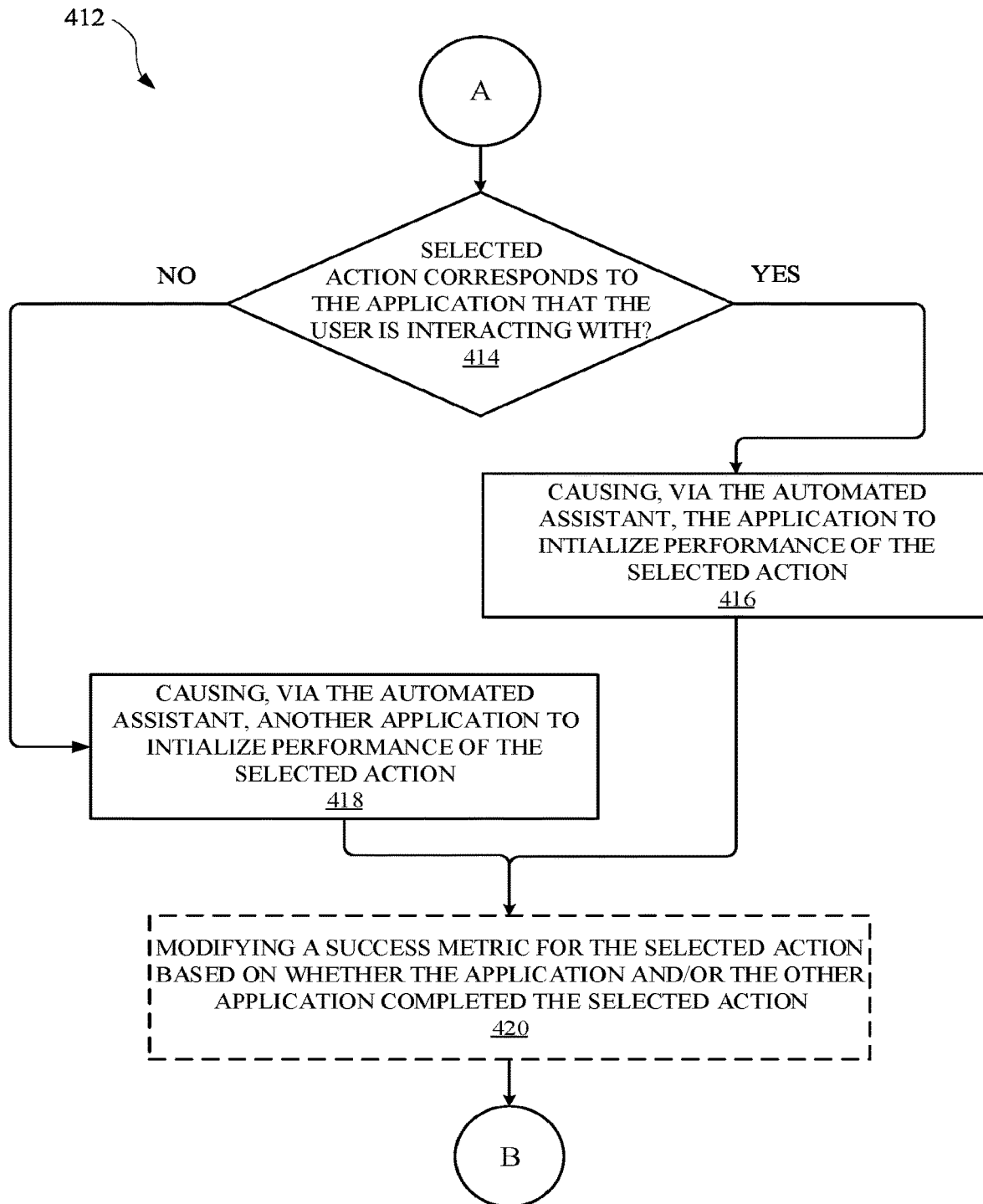

FIGS. 4A and 4B illustrate a method 400 for controlling a non-assistant application via an automated assistant while simultaneously accessing the non-assistant application, or a separate application that is different from the non-assistant application and the automated assistant. The method 400 can be performed by one or more computing devices, applications, and/or any other apparatus or module capable of interacting with one or more different applications. The method 400 can include an operation 402 of determining that a user has provided a spoken utterance while interacting with an application that is separately accessible from an automated assistant. The application can be, for example, an organizational application for organizing tasks, emails, and schedules. The user can be accessing the application via a portable computing device, such as a cell phone. The user can interact with the application in order to access incoming emails via a first graphical user interface of the application. While interacting with the application at the first graphical user interface, the user can provide spoken utterance such as, "Add this event to my calendar," in reference to an email that has just been received and includes an event invitation.

In response to receiving the spoken utterance, the method 400 can proceed from the operation 402 to the operation 404. The operation 404 can include accessing application data characterizing one or more actions capable of being performed by one or more applications. The application data can characterize the one or more actions, as well as properties of the one or more actions and/or other information associated with the one or more actions. For example, the application data can be embodied as a schema file that lists one or more actions capable of being performed by one or more applications, as well as a list of features and/or properties of each action of the one or more actions. A feature for a particular action can characterize an output modality and/or an input modality corresponding to the particular action. Alternatively, or additionally, a feature of a particular action can characterize a type of data that is affected by performance of the particular action. As an example, a "play" action can be listed with corresponding information that lists "speaker" as an output modality affected by performance of the "play" action, and "audio" as a type of data that is used during performance of the action (e.g., {"play": [output modality: speaker], [type of data: audio], . . . }). As another example, a "new event" action can be listed with information that lists "calendar data" as a type of data that is accessed and/or edited during performance of the action, and "adding events to a calendar" as a description of the "new event" action.

The method 400 can proceed from the operation 404 to an optional operation 406, which can include accessing contextual data characterizing one or more features and/or properties of an engagement between the user and the application. The contextual data can be based on one or more properties of the computing device during the engagement between the user and the application, one or more other computing devices, and/or any other signals that can be associated with the interaction between the user and the application. For example, while the user is interacting with the organizational application, the organizational application can provide the user with a notification regarding an incoming email message to the organizational application. The contextual data can be generated by the organizational application, the automated assistant, and/or any other application that is accessible via the computing device. For example, the automated assistant can identify changes at a display panel of the computing device and generate the contextual data based on changes in content being provided at the display panel.

The method 400 can further include an operation 408 of determining a correlation between the spoken utterance provided by the user and the data. Determining the correlation can include comparing content of the spoken utterance (e.g., "Add this event to my calendar.") with the application data and/or the contextual data. For example, the application data can characterize the aforementioned "new event" action that includes "adding events to a calendar" as a description of the "new event" action. The correlation between the spoken utterance and the "new event" action can be stronger than a different determined correlation between the spoken utterance and the "play" action, at least based on the spoken utterance including the terms "add" and "event," and the description of the "new event" action also having the terms "add" and "event." In some implementations, a machine learning model can be used to identify one or more actions that are associated with the spoken utterance. For example, machine learning model that has been trained according to a deep forest and/or deep learning method can be employed to identify correlations between content of the spoken utterance and content of the application data.

In some implementations, the determined correlation between the contextual data and the application data can be determined in order to identify a suitable action to initialize in response to be spoken utterance from the user. For example, the contextual data can characterize the notification about the message received while the user was viewing the first graphical user interface. This correlation between the application data and the contextual data can be used to further rank one or more actions identified by the application data. For instance, in response to the organizational application receiving an incoming message, the organizational application can modify the application data to indicate that the "new event" action is available for execution. Alternatively, or additionally, the organizational application can generate updated contextual data in response to the organizational application receiving the incoming message. The updated contextual data can then be used to rank and/or prioritize one or more actions capable of being performed by the organizational application and/or another application that is separate from the automated assistant.

The method 400 can further include selecting an action from one or more actions based on the determined correlation. The action can be selected based on a rank and/or priority assigned to the action according to the determined correlation. For example, the "new event" action can be prioritized over any other action based on the application data indicating that the "new event" action is capable of being performed by the organizational application in a given state and/or status of the organizational application. Alternatively, or additionally, the "new event" action can be prioritized over any other action based on the contextual data characterizing a notification that correlates to the spoken utterance provided by the user. In some implementations, the application data can characterize actions capable of being performed by one or more different applications, including the organizational application. Therefore, the action that is selected to be performed can correspond to an application that is different from the automated assistant and also not currently rendered at the foreground of the graphical user interface for the operating system of the computing device. In other words, in response to the spoken utterance, the automated assistant can initialize a different application from the organizational application and the automated assistant, in order to initialize performance of the selected action.

The method 400 can proceed from the operation 410 to the operation 414 of method 412, via continuation element "A." The continuation element "A" can represent a connection between the method 400 and the method 412. The method 412 can include an operation 414 of determining whether the selected action corresponds to the application that the user is interacting with. When the action corresponds to the application that the user is interacting with, the method 412 can proceed from the operation 414 to the operation 416. The operation 416 can include causing, via the automated assistant, the application to initialize performance of the selected action. Alternatively, when the selected action does not correspond to the application that the user is accessing, and/or does not correspond to the application that is rendered in the foreground of the display interface of the computing device, the method 400 can proceed from the operation 414 to the operation 418. The operation 418 can include causing, via the automated assistant, another application to initialize performance of the selected action.

The method 400 can proceed from the operation 418 to an optional operation 420, which can include modifying a success metric for the selected action based on whether the application and/or the other application completed the selected action. The success metric can correspond to a particular action and/or application, and can reflect a reliability of application to perform the particular action when invoked via the automated assistant and/or when the application is not executing in the foreground of a graphical user interface. In this way, as a user attempts to initialize certain actions, the actions can be ranked and/or prioritize for selection at least partially based on their respective success metric. Should a success metric for a particular action be low, and/or not satisfy a threshold, the user can be prompted to manually initialize the action, at least in response to the automated assistant selecting that particular action for initialization. The method 400 can proceed from the operation 418 and/or the optional operation 420 back to the method 400 at operation 402, via continuation element "B," as illustrated in FIG. 4B and FIG. 4A.

When the "new event" action corresponds to the organizational application, which is presented in the foreground of the display interface, the organizational application can execute the "new event" action in accordance with the spoken utterance provided by the user. As a result, the organizational application can generate a calendar entry using the content of the spoken utterance and/or the notification provided by the user. When the "new event" action that does not correspond to the organizational application, but rather corresponds to another application such as a social media application or other application that manages a calendar, the automated assistant can initialize performance of the "new event" via the other application. In this way, the user does not have to navigate away from the application that is being rendered in the foreground of a display interface. Furthermore, when the selected action corresponds to the application in the foreground, but can be executed via a graphical user interface of the application, the user can streamline initialization of the selected action, reducing delay times that would otherwise be exhibited when navigating between interfaces of the application. This allows for a variety of different modalities to control a variety of different actions, despite explicit controls for those different actions not being presently rendered at a display interface. By reducing an amount of graphical data processing that would otherwise be consumed switching between graphical interfaces of an application, wasting of GPU bandwidth can be eliminated.

Figure 5:
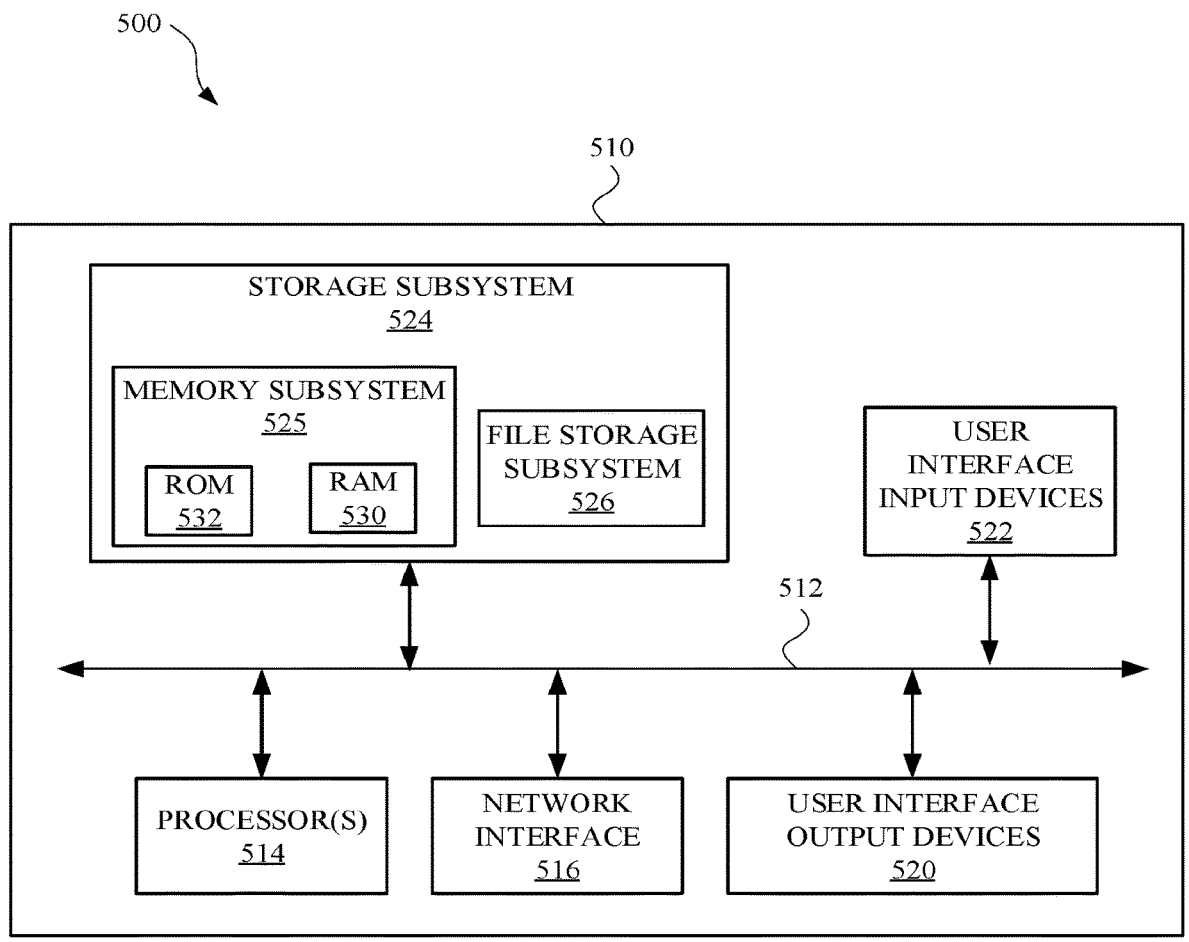
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (crt), a flat-panel device such as a liquid crystal display (lcd), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 104, computing device 204, action engine 126, action engine 226, automated assistant 130, automated assistant 230, automated assistant 304, computing device 302, and/or any other application, device, apparatus, engine, and/or module discussed herein.

These software modules are generally executed by processor 514 alone or in combination with other processors. Memory 525 used in the storage subsystem 524 can include a number of memories including a main random access memory (ram) 530 for storage of instructions and data during program execution and a read only memory (rom) 532 in which fixed instructions are stored. A file storage subsystem 526 can provide persistent storage for program and data files, and may include a hard disk drive, a floppy disk drive along with associated removable media, a cd-rom drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, zip code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method is provided that includes determining, by a computing device while an application is executing at the computing device, that a user has provided a spoken utterance that is directed to an automated assistant but does not explicitly identify any application that is accessible via the computing device. The spoken utterance is received at an automated assistant interface of the computing device, and the automated assistant is separately accessible from the application. The method further includes accessing, based on determining that the user has provided the spoken utterance, application data characterizing multiple different actions capable of being performed by the application that is executing at the computing device, determining, based on the application data, a correlation between content of the spoken utterance provided by the user and the application data, and selecting an action, from the multiple different actions characterized by the application data, for initializing via the automated assistant. The action is selected based on the correlation between the content of the spoken utterance and the application data. The method further includes, when the selected action corresponds to one of the multiple different actions capable of being performed by the application that is executing at the computing device, causing, via the automated assistant, the application to initialize performance of the selected action.

These and other implementations of the technology may include one or more of the following features.

In some implementations, the application data may further characterize other actions capable of being performed via one or more other applications that are separately accessible from the automated assistant and the application. In some of those implementations, the method may further include, when the selected action corresponds to one of the other actions capable of being performed by another application that is different from the application that is executing at the computing device, causing, via the automated assistant, the other application to initialize performance of the selected action.

In some implementations, the application data may identify one or more contextual actions of the multiple different actions based on one or more features of a current application status of the application when the user provided the spoken utterance. In some of those implementations, the one or more contextual actions may be identified by the application and the one or more features characterize a graphical user interface of the application rendered when the user provided the spoken utterance. In some of those implementations, the one or more contextual actions may be additionally and/or alternatively identified by the application based on a status of an ongoing action that is being performed at the computing device when the user provided the spoken utterance.

In some implementations, the method may further include determining a success metric for one or more actions of the multiple different actions. The success metric for a particular action may be based at least on a number of times the particular action has been completely performed in response to the user, and/or one or more other users, initializing the particular action via the automated assistant. Further, the action may be selected based further on the success metric for the action relative to other actions of the multiple different actions. In some of those implementations, the method may further include subsequent to causing the application and/or another application to initialize performance of the action: determining whether the action was completely performed by the application and/or the other application, and causing, based on whether the action was completely performed by the application and/or the other application, a corresponding success metric for the action to be modified.

In some implementations, the method may further include, prior to determining that the user has provided the spoken utterance while the application is executing at the computing device, determining that another application provided a notification to the user via an interface of the computing device while the application is executing at the computing device. The application data may include other data that characterizes another action capable of being performed by the other application, and the other data may be requested from other application in response to the user providing the spoken utterance. In some implementations, the application data may additionally and/or alternatively identify the multiple different actions capable of being performed by the application, and/or identify descriptive data for each action of the multiple different actions. Further, particular descriptive data for a particular action of the multiple different actions characterizes two or more properties of the particular action. In some of those implementations, the two or more properties may include an action type name that characterizes a type of action corresponding to the particular action, and/or an interface type name corresponding to a type of interface that renders content during execution of the particular action.

In some implementations, determining that the user has provided the spoken utterance that is directed to the automated assistant but does not explicitly identify any application that is accessible via the computing device may include generating, at the computing device, audio data that embodies the spoken utterance provided by the user, and processing, at the computing device, the audio data according to a speech-to-text process and/or a natural language understanding process. In some of those implementations, the computing device includes one or more processors, and the speech-to-text and/or the natural language understanding process are performed using one or more processors of the processors of the computing device.

In some implementations, a method is provided that includes determining, by a computing device that provides access to an automated assistant, that a user has provided one or more inputs for invoking the automated assistant. The one or more inputs are provided by the user while an application is exhibiting a current application status. The method further includes accessing, based on determining that the user has provided the one or more inputs, application data characterizing multiple different actions capable of being performed via one or more applications that include the application. The application data characterizes contextual actions that can be performed by the application when the application is exhibiting the current application status. The method further includes determining, based on the application data, a correlation between content of a spoken utterance that the user provided while the application is exhibiting the current application status. The spoken utterance does not explicitly identify any application that is accessible via the computing device. The method further includes selecting, based on the correlation between the content of the spoken utterance and the application data, an action from the contextual actions characterized by the application data, and, when the selected action corresponds to one of the contextual actions that can be performed by the application when the application is exhibiting the current application status, causing, via the automated assistant, the application to initialize performance of the selected action.

These and other implementations of the technology may include one or more of the following features.

In some implementations, the current application status may be exhibited by the application when the application is being rendered in a foreground of a display interface of the computing device and/or another computing device. In some of those implementations, the method may further include, when the selected action corresponds to another application that is different from the application that is exhibiting the current application status, causing, via the automated assistant, the other application to initialize performance of the selected action.

In some of those implementations, the application data may characterize another action that is initialized via selection of one or more graphical interface elements omitted from the display interface when the current application status is exhibited by the application. In some of those implementations, determining that the user has provided the spoken utterance that is directed to the automated assistant but does not explicitly identify any application that is accessible via the computing device may include generating, at the computing device, audio data that embodies the spoken utterance provided by the user, and processing, at the computing device, the audio data according to a speech-to-text process and/or a natural language understanding process. In some of those implementations, the computing device may include one or more processors, and the speech-to-text process and/or the natural language understanding process may be performed using the one or more processors of the computing device.

In some implementations, a method is provided that includes receiving, from an automated assistant and while a user is accessing an application that is available via a computing device, an indication that the user has provided a spoken utterance. The spoken utterance does not explicitly identify any application that is accessible via the computing device, and the automated assistant is separately accessible from the application. The method further includes providing, in response to receiving the indication that the user has provided the spoken utterance, application data that characterizes one or more contextual actions. The one or more contextual actions are identified by the application based on an ability of the application to initialize performance of the one or more contextual actions while the application is in a current state, and are selected from multiple different actions based on the current state of the application. The method further includes, causing, based on providing the application data, the automated assistant to determine whether the spoken utterance corresponds to a particular action of the one or more contextual actions characterized by the application data, and, when the automated assistant determines that the spoken utterance corresponds to the particular action of the one or more contextual actions characterized by the application data, causing, based on the spoken utterance corresponding to the particular action, the automated assistant to initialize performance of the particular action via the application.

These and other implementations of the technology may include one or more of the following features.

In some implementations, the application data may also identify descriptive data for each contextual action of the one or more contextual actions. Further, particular descriptive data for a particular contextual action may characterize two or more properties of the particular contextual action. In some of those implementations, the two or more properties include an action type name that characterizes a type of action corresponding to the particular contextual action, and/or an interface type name corresponding to a type of interface that renders content during execution of the particular contextual action.

In some implementations, a method is provided that includes receiving, at a third-party application and while another application is executing at a computing device, a request from an automated assistant to provide application data characterizing one or more actions capable of being performed by the third-party application. The request is provided by the automated assistant in response to a user providing one or more inputs to invoke the automated assistant while the other application is executing at the computing device. The method further includes providing, in response to receiving the request from the automated assistant, the application data to the automated assistant. The application data identifies a particular action capable of being performed by the third-party application initialized via the automated assistant. The method further includes causing, based on providing the application to the automated assistant, the automated assistant to determine whether a spoken utterance provided by the user was directed at initializing performance of the particular action by the third-party application. The spoken utterance does not explicitly identify any application that is accessible via the computing device. The method further includes, when the automated assistant determines, based on the application data, that the spoken utterance was directed at the application, causing, based on the action data, the automated assistant to initialize performance of the action via the application.

These and other implementations of the technology may include one or more of the following features.

In some implementations, the other application may be rendered in a foreground of a display interface of the computing device and the third-party application may be omitted from the foreground of the display interface of the computing device. In some of those implementations, the application data may additionally and/or alternatively identify descriptive data corresponding to the particular action, and the descriptive data characterizes two or more properties of the particular action. In some of those further implementations, the two or more properties include an action type name that characterizes a type of action corresponding to the particular action, and/or an interface type name corresponding to a type of interface that renders content during execution of the particular action.

Other implementations may include a non-transitory computer readable storage medium and/or a computer program storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system having one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

We claim:

1. A system comprising:
   memory storing instructions;
   one or more processors operable to execute the instructions to:
      determine that a user has provided, at a computing device, a spoken utterance that is directed to an automated assistant but does not explicitly identify any application that is accessible via the computing device,
         wherein the spoken utterance is received at an automated assistant interface of the computing device, and
         wherein the automated assistant is a separate application from an application;
      access, based on determining that the user has provided the spoken utterance that is directed to the automated assistant, application data characterizing multiple different actions capable of being performed by the application;
      determine, based on the application data, a correlation between content of the spoken utterance provided by the user and the application data;
      in response to determining the correlation between the content of the spoken utterance provided by the user and the application data:
         select, based on the content of the spoken utterance, an action from the multiple different actions characterized by the application data; and
         cause the application to perform the selected action.

2. The system of claim 1, wherein the application data includes a schema file that includes action natural language description that characterizes the multiple different actions capable of being performed by the application.

3. The system of claim 2, wherein the schema file further includes features natural language description that characterizes an output modality for the action.

4. The system of claim 2, wherein the schema file further includes features natural language description that characterizes an input modality for the action.

5. The system of claim 2, wherein the schema file further includes features natural language description that characterizes an input modality for the action and an output modality for the action.

6. The system of claim 1, wherein one or more of the processors are further operable to execute the instructions to:
   access additional application data that characterizes other actions capable of being performed via an additional application that is separately accessible from the automated assistant and the application;
   wherein in determining the correlation between the content of the spoken utterance provided by the user and the application data one or more of the processors are to determine the correlation further based on the additional application data.

7. The system of claim 1, wherein the application data identifies one or more contextual actions of the multiple different actions based on one or more features of a current application status of the application when the user provided the spoken utterance.

8. The system of claim 7, wherein the one or more contextual actions are identified by the application and the one or more features characterize a graphical user interface of the application rendered when the user provided the spoken utterance.

9. The system of claim 7, wherein the one or more contextual actions are identified by the application based on a status of an ongoing action that is being performed at the computing device when the user provided the spoken utterance.

10. The system of claim 1, wherein in determining that the user has provided the spoken utterance that is directed to the automated assistant but does not explicitly identify any application that is accessible via the computing device one or more of the processors are to:
   perform speech-to-text processing of audio data, that embodies the spoken utterance provided by the user, to generate the content of the spoken utterance.

11. The system of claim 1, wherein one or more of the processors are of the computing device.

12. A method implemented by one or more processors, the method comprising:
   determining that a user has provided a spoken utterance, wherein the spoken utterance includes natural language content that does not explicitly identify any application that is accessible via the computing device, and wherein the spoken utterance is received at an automated assistant interface of an automated assistant of a computing device;

accessing, based on determining that the user has provided the spoken utterance, application data that includes a schema file that includes action natural language description of multiple different actions capable of being performed by an application, the application being in addition to the automated assistant;

determining, based on processing the natural language content and the action natural language description of the schema file:
  that the spoken utterance is directed to the application, and
  an action from the multiple different actions capable of being performed by the application; and in response to determining that the spoken utterance is directed to the application and determining the action:
  causing the application to perform the action.

13. The method of claim 12, wherein the schema file further includes features natural language description that characterizes an output modality for the action.

14. The method of claim 12, wherein the schema file further includes features natural language description that characterizes an input modality for the action.

15. The method of claim 12, wherein the schema file further includes features natural language description that characterizes an input modality for the action and an output modality for the action.

16. The method of claim 12, wherein the application data identifies one or more contextual actions of the multiple different actions based on one or more features of a current application status of the application when the user provided the spoken utterance.

17. The method of claim 16, wherein the one or more contextual actions are identified by the application and the one or more features characterize a graphical user interface of the application rendered when the user provided the spoken utterance.

18. The method of claim 16, wherein the one or more contextual actions are identified by the application based on a status of an ongoing action that is being performed at the computing device when the user provided the spoken utterance.

* * * * *